April 23, 1935.  M. M. BORDEN ET AL  1,999,080
PRESSURE DIFFERENTIAL CONNECTION FOR METERS
Filed April 5, 1932
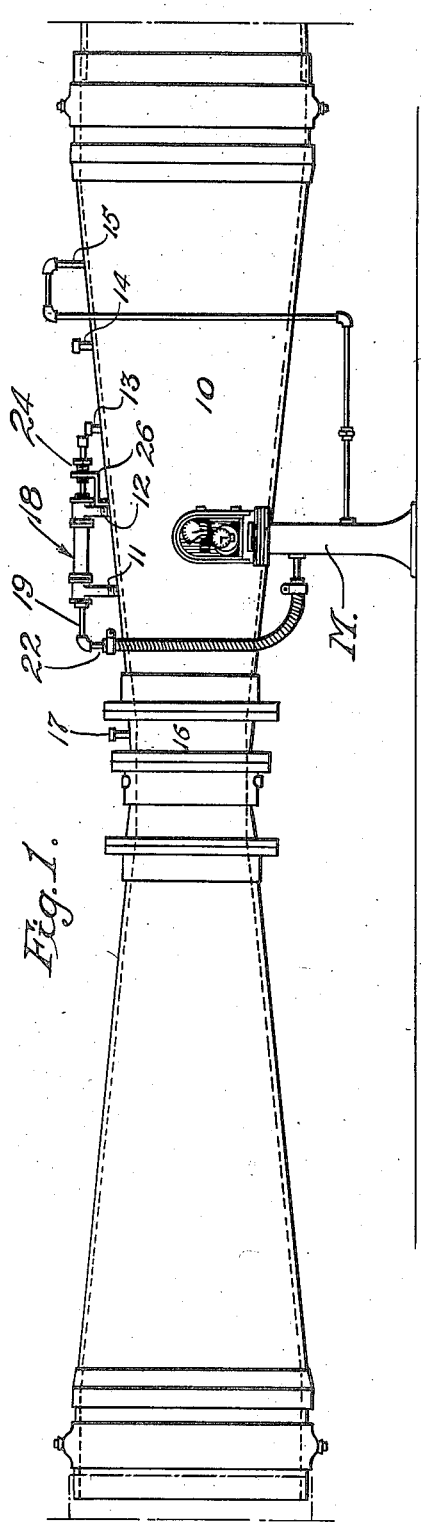
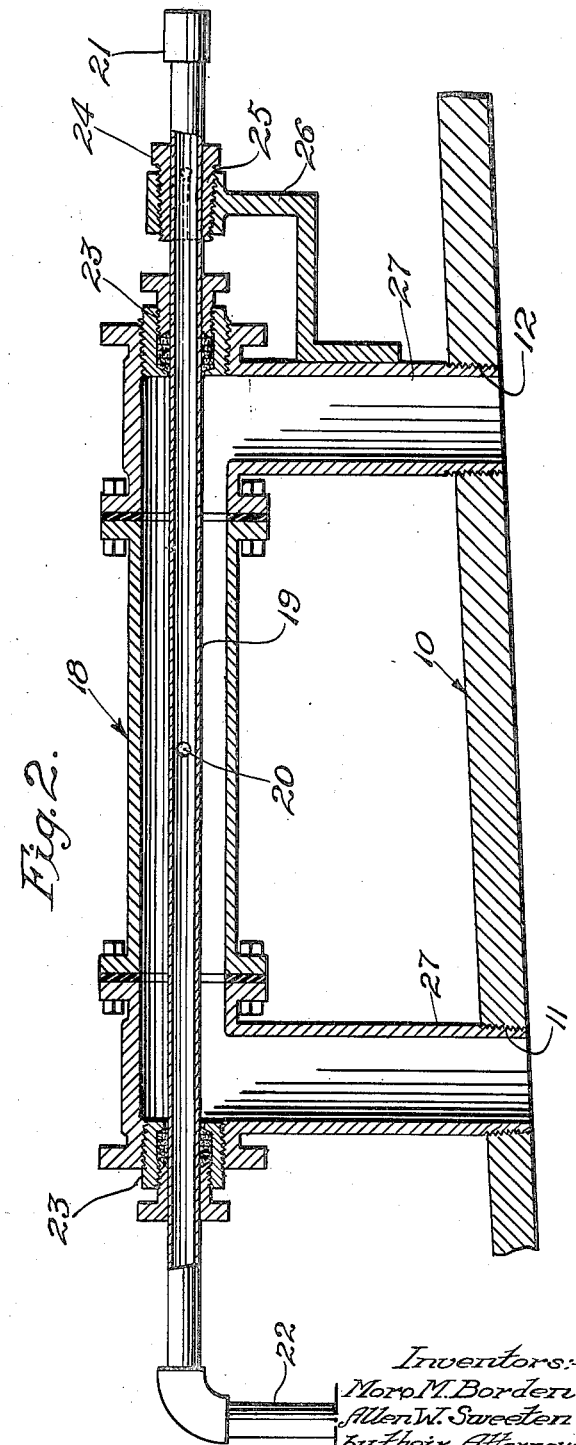

Patented Apr. 23, 1935

1,999,080

UNITED STATES PATENT OFFICE 1,999,080

PRESSURE DIFFERENTIAL CONNECTION FOR METERS

Moro M. Borden, Philadelphia, Pa., and Allen W. Sweeten, Pitman, N. J., assignors to Simplex Valve & Meter Company, Philadelphia, Pa., a corporation of Delaware Application April 5, 1932, Serial No. 603,434

12 Claims. (Cl. 73—167)

This invention relates to connections between meters and conduits or casings containing a moving fluid, and in which the pressure differential results from such movements, and more particularly to a means enabling accurate adaptation of a standard meter to such conduits or casings. It often happens that after installation of a conduit it becomes necessary to change the meter employed in connection therewith or to apply a meter thereto; the former ordinarily resulting from a change of flow in the conduit. For example, flow lines containing venturi often have the flow increased therein to such an extent that the flow is not proportionate to the installed venturi and, since this will render the venturi inaccurate in connection with the meter for which it was originally designed, a new meter must be supplied or a properly proportioned venturi inserted. Since insertion of a new venturi would mean cutting off the flow, often an impossibility, the use of a new meter is generally resorted to.

Under such circumstances it is the practice to tap either the upstream or downstream end of the venturi; preferably the latter; at spaced points; manometer tests taken across these points will provide two points at which a meter can be connected. Now the true flow through a conduit containing a Venturi tube or its equivalent device is measured preferably by a U tube with its balancing liquid. When such is connected to the regular main and throat sections of a Venturi tube or to the proper connections on either side of an orifice, accurate calculations of the rate of discharge may be based upon the resulting deflections of the balancing liquid in the U tube. It is, however, necessary in connecting the meter to specially design the meter and meter chart, for such taps are located approximately, and one cannot provide connections giving pressures exactly suitable to a standard meter without experimental work in their relocation. A standard meter signifies a measuring device accommodating only a certain maximum pressure differential and which would not be accurately operative if subjected to greater pressure differentials.

An important object of the present invention is to provide connection apparatus for use in conjunction with overloaded venturi, or with venturi as originally installed where there is a probability of such overloading, which connection is of such character that a suitable differential pressure variation can be obtained, thus enabling the use of a standard meter.

A further and more specific object of the invention is the provision of an arrangement such that the effective position of one of the tap openings may be adjustably varied so that an accurate accommodation to a standard meter which has been provided with flow scales, chart or means for totalizing the flow, designed upon the basis of assumed exact relations of pressure differential to flow may be had and this accommodation may be substantially varied if demands upon the flow line with which the meter is being employed vary and the pressures at the connections vary as a result thereof so that the meter becomes inaccurate or of insufficient capacity.

A further object of the invention is the provision of a connection which may be employed to accurately adapt a standard meter without the exercise of skill or experimentation and which can be employed in practically any situation where a pressure differential exists in a conduit or casing.

These and other objects we attain by the construction shown in the accompanying drawing wherein, for the purpose of illustration, we have shown a preferred embodiment of our invention and wherein:

Fig. 1 is a side elevation of a venturi having a meter connected therewith in accordance with our invention; and Fig. 2 is a longitudinal sectional view through the adjustable connection.

Referring now more particularly to the drawing, the numeral 10 generally designates the downstream end of a standard venturi; 11, 12, 13, 14 and 15, taps through the wall of the venturi and spaced longitudinally of such downstream end. As is well known to those familiar with the art the pressures derived at such taps increase with the recession of the tap from the Venturi throat 16. Due, however, to internal conditions attending flow as turbulence, it is impossible to accurately compute the pressures derived from any of the taps, particularly those near the throat, so that when the taps are made it is not known with sufficient exactness for operation of standard meters how much the pressure at the tap 11 will be less than that at the tap 12, and that at the tap 12 less than that at the tap 13, and so forth. Standard meters such as that generally designated at M are, of course, designed to operate with the delivery of fixed pressure differentials under certain fixed flow rates.

In accordance with the present invention, one terminal of this meter is connected to a fixed tap taken from the venturi which may be any one of the taps 11 to 15 or a further tap 17 taken for example at the throat of the venturi. The differential between the selected tap, at present shown as the tap 15, and any of the remaining taps 11, 12, 13 and 14, will probably fail to provide an accurate tap for the second connection for the standard meter. However, the pressure necessary for the second meter connection, in order that proper differential may be had, will be positively indicated as lying between two of the remaining taps, as for example, and as in the present showing, between the taps 11 and 12. The taps 11 and 12 are then connected by a pipe 18 extending longitudinally of the venturi, the ends of the pipe communicating with the taps while the central portion of the pipe has extending longitudinally therethrough a longitudinally shiftable tube 19 having an opening 20 formed therein communicating with the interior of the pipe and having one end thereof closed as at 21 and the opposite end thereof adapted for an outlet to a meter connection at 22. This tube extends through packing glands 23 at the end walls of the central section of pipe 18 and has associated therewith a locking means 24 whereby it may be locked in adjusted positions. The locking means 24 is at present shown as comprising a tapered split sleeve 25 mounted in a bracket 26 carried by one of the end portions of the pipe 18 and having the tube 19 passed therethrough. By loosening the sleeve in its mounting in the bracket, the tube 19 is released and may be shifted to a new position.

It will be apparent that the pressure at the tap 12 will be greater, because of its relatively lower velocity, than that at the tap 11 where the cross sectional area is smaller and the velocity higher. A small fluid flow will, therefore, take place from the connection 12 through the pipe 18, past the opening 20 and through the connection 11 into the Venturi tube or main. Furthermore, it will be seen that the pressures between the taps 12 and 11 will have different intensity at different points in this auxiliary conduit, composed of the taps 12 and 11, the pipes 27 and 18, the highest pressure value being adjacent to 12 and the lowest at the outlet 11.

It will be obvious that by longitudinally shifting this tube the opening 20 may be placed so that the desired intermediate pressure between the pressures delivered at the taps 11 and 12 is obtained and, accordingly, adjustment of this tube will provide an accurate pressure differential with the second tap to which the standard meter is connected. Obviously, if the flow rate through the venturi is varied at any time to an extent destroying the exact pressure differential thus obtained, the tube 19 may be again adjusted to correct the error by the means described. While we have shown an excess of taps as having been made in the venturi beyond those which are actually employed in meter connections, it will be understood that with knowledge of the flow rate and size of the venturi it will be readily possible to compute the relative positions of taps such as taps 11, 12, and 15 so that with the meter connection at the tap 15 the proper pressure differential will be obtained by the taps 11 and 12, thus eliminating the necessity for the formation of the additional taps 13 and 14.

While we have above described the connections as having been made at the downstream end of the venturi, it is to be understood that this is merely a description of a preferred location for, obviously, taps could be made at any point where a proper pressure differential could be obtained. Furthermore, the apparatus is not necessarily associated with either a flow conduit or with a venturi. It is readily possible to employ the apparatus with any means and in any location where a pressure differential does exist. We do not, therefore, wish to be understood as limiting ourselves to the particular adaptation or location herein illustrated except as hereinafter claimed.

We claim:

1. In combination with a venturi, a pressure-differentials-operated meter associated therewith, a fixed tap in the venturi and connected with one terminal of said meter, an elongated pipe, connections between said pipe and the venturi providing different pressures at opposite ends of the pipe, an outlet for said pipe micrometrically adjustable longitudinally of the pipe and a connection between the second terminal of the meter and said adjustable outlet.

2. In combination with a venturi, a meter operated by pressure differentials associated therewith, a connection between one terminal of the meter and a fixed tap in the venturi, a conduit communicating with the venturi at longitudinally spaced points and including a section extending longitudinally of the venturi and lying between said points, a tube adjustable longitudinally of said section and having an opening within said section and a connection between said tube and the second terminal of said meter.

3. An adjustable tap for venturis comprising a conduit extending longitudinally of the venturi and having its ends communicating with the venturi at points spaced longitudinally thereof, and a tube adjustable longitudinally of said conduit and having an opening communicating with said conduit.

4. In combination with a venturi, a meter operated by pressure differentials associated therewith, a connection between one terminal of the meter and a fixed tap in the venturi, a conduit paralleling the axis of the venturi communicating with the venturi at longitudinally spaced points, a tube adjustable longitudinally of said conduit and having an opening within said conduit and a connection between said tube and the second terminal of said meter.

5. In combination with a venturi, a meter operated by pressure differentials associated therewith, a connection between one terminal of the meter and a fixed tap in the venturi, a conduit communicating with the venturi at longitudinally spaced points, and a connection between the conduit and the second terminal of the meter adjustable longitudinally of the conduit.

6. An adjustable tap for venturis comprising a conduit having its ends communicating with the venturi at points spaced longitudinally thereof, a tube adjustable longitudinally of said conduit and having an opening communicating with said conduit, and means for locking the tube in adjusted positions.

7. In combination with a conduit containing a moving fluid, a pair of taps communicating with the conduit at points of different pressure therein, an outlet and a connection in communication with both said taps and with said outlet along which said outlet is adjustable to determine the point of communication with the connection.

8. An adjustable tap for conduits comprising a duct communicating with the conduit at points of different pressure in the conduit and an outlet for said duct adjustable longitudinally of the duct.

9. An adjustable tap for conduits comprising a duct communicating with the conduit at points of different pressure in the conduit, an outlet for said duct adjustable longitudinally of the duct, and means for locking said outlet in adjusted positions.

10. In combination with a conduit and means producing pressure differentials in a moving fluid in the conduit, a meter operated by pressure differentials associated with the conduit, a connection between one terminal of the meter and a fixed tap in the conduit, a duct communicating with the conduit at points therein having different pressures resulting from said means, an outlet for said duct adjustable longitudinally of the duct and a connection between said outlet and the second terminal of the meter.

11. The combination with a conduit and a pressure-differential-operated meter associated therewith, of a fixed tap in the conduit connected with one terminal of the meter, a pipe, connections between opposite ends of the pipe and a conduit providing different pressures at opposite ends of the pipe, an outlet for the pipe adjustable longitudinally of the pipe and a connection between the outlet and a second terminal of the meter.

12. In combination with a venturi, a pressure-differentials-operated meter associated therewith, a fixed tap in the venturi and connected to one terminal of the meter, an exteriorly disposed conduit connecting points of different pressure in the venturi whereby there is a continual flow through said conduit, an outlet adjustable longitudinally of said conduit and a connection between the second terminal of the meter and said adjustable outlet.

MORO M. BORDEN.
ALLEN W. SWEETEN.